United States Patent
Doyle et al.

(10) Patent No.: US 8,595,735 B2
(45) Date of Patent: *Nov. 26, 2013

(54) HOLISTIC TASK SCHEDULING FOR DISTRIBUTED COMPUTING

(75) Inventors: Ronald P. Doyle, Research Triangle Park, NC (US); David L. Kaminsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,669

(22) Filed: Feb. 28, 2012

(65) Prior Publication Data

US 2012/0216203 A1   Aug. 23, 2012

Related U.S. Application Data

(62) Division of application No. 12/828,281, filed on Jun. 30, 2010.

(51) Int. Cl.
*G06F 9/46* (2006.01)
*G06F 15/173* (2006.01)

(52) U.S. Cl.
USPC .......................................... 718/102; 709/226

(58) Field of Classification Search
None
See application file for complete search history.

(56) References Cited

U.S. PATENT DOCUMENTS

| | | | |
|---|---|---|---|
| 5,452,461 A * | 9/1995 | Umekita et al. | 717/149 |
| 6,944,736 B2 * | 9/2005 | Wilson et al. | 711/167 |
| 7,793,294 B2 * | 9/2010 | Haeri | 718/102 |
| 8,230,070 B2 * | 7/2012 | Buyya et al. | 709/226 |
| 8,302,097 B2 * | 10/2012 | Buco et al. | 718/102 |
| 2010/0269116 A1 * | 10/2010 | Potkonjak | 718/103 |
| 2010/0281166 A1 * | 11/2010 | Buyya et al. | 709/226 |

OTHER PUBLICATIONS

Netto et al.,Offer-based Scheduling of Deadline-Constrained Bag-of-Tasks . . . ,Technical Report, GRIDS-TR-2008-17, Univ. of Melbourne, Australia Dec. 12, 2008.
Kiran et al., Execution Time Prediction of Imperative Paradigm Tasks for Grid Scheduling Optimization, IJCSNS Int.Journal of Comp. Science, vol. 9 No. 2, Feb. 2009.

* cited by examiner

*Primary Examiner* — Charles E Anya
*Assistant Examiner* — Phuong Hoang
(74) *Attorney, Agent, or Firm* — Steven M. Greenberg, Esq.; Carey, Rodriguez, Greenberg & O'Keefe

(57) ABSTRACT

Embodiments of the present invention provide a method for holistic task scheduling in a distributed computing environment. In an embodiment of the invention, a method for holistic task scheduling in a distributed computing environment is provided. The method includes selecting a first task for a first job and a second task for a different, second job, both jobs being scheduled for processing within a node of a distributed computing environment by a task scheduler executing in memory by at least one processor of a computer. The method also can include comparing an estimated time to complete the first and second jobs. Finally, the first task can be scheduled for processing in the node when the estimated time to complete the second job exceeds the estimated time to complete the first job. Otherwise the second task can be scheduled for processing in the node when the estimated time to complete the first job exceeds the estimated time to complete the second job.

4 Claims, 2 Drawing Sheets

HOLISTIC TASK SCHEDULING FOR DISTRIBUTED COMPUTING

CROSS-REFERENCE TO RELATED APPLICATIONS

This application is a Divisional of U.S. application Ser. No. 12/828,281, filed Jun. 30, 2010, currently pending, the entirety of which is incorporated herein by reference.

BACKGROUND OF THE INVENTION

1. Field of the Invention

The present invention relates to distributed computing and more particularly to scheduling of tasks comprising a job in different nodes of a distributed computing system.

2. Description of the Related Art

Distributed computing refers to the distribution of a computing tasks to one or more selected nodes amongst several nodes in a computing cluster within a network environment. Early forms of the distributed computing model were embodied by a cluster of nodes—generally complete servers or server images—wholly within the control of a central operator. With the advent of Web services and grid based computing, modern forms of distributed computing are embodied by the cloud computing model. Cloud computing generally refers to a collection of nodes disposed upon the global Internet with disparate controlling entities providing processing on demand as a service to different requestors usually for a fee. Irrespective of the nature of a distributed computing system, scheduling of jobs to different nodes remains paramount to the operation of a distributed computing system.

Task scheduling relates to the determination of one or more nodes in a cluster both able and also desired to process a selected task or tasks in a manner most likely to meet the processing objectives of the distributed computing system. By completing the tasks, the distributed computing infrastructure completes the job comprised of the tasks. In the most basic circumstance, the least taxed node in a cluster is assigned a pending task so as to perform the task in a most expedient manner. In a more sophisticated circumstance, the resources of available nodes can be matched to the task at hand to ensure efficient processing of a job, regardless of whether efficient processing refers to the fastest time to process the job, the most energy-efficient time to process the task, or the lowest cost to process the task. In an even more sophisticated circumstance, the assignment of tasks to nodes in a cluster can be balanced to ensure that no one node receives a burdensome portion of the load. Finally, the terms of a service level agreement (SLA) for a particular customer's job are associated with a task to be scheduled can be taken into account when selecting available nodes to process the task.

While the foregoing assumes discrete tasks scheduled for processing in different nodes of a computing cluster, not all computing can be related to the processing of discrete tasks. Rather, in some circumstances, a collection of tasks that alone lack stand-alone meaning, can combine as part of a larger job of meaning A prime example includes tasks resulting from parallel computing in which a problem is subdivided into multiple tasks and assigned different nodes for processing the tasks in parallel. The result set from the processed tasks subsequently are combined to produce a result for the job. Map/Reduce computing is a technology outgrowth of parallel computing as it relates to computation processing.

As it is well known, Map/Reduce has two main components a "Map" step and a "Reduce" step. In the "Map" step, the master node accepts input, chops the input into smaller sub-problems (tasks), and distributes those smaller sub-problems to correspondingly different worker nodes. (A worker node may do this again in turn, leading to a multi-level tree structure). The worker node in turn processes that smaller problem, and passes the answer back to its master node. Thereafter, in the "Reduce" step, the master node then takes the answers to all the sub-problems and combines them in a way to get the output—the answer to the problem it was originally trying to solve.

One advantage of Map/Reduce is that Map/Reduce allows for distributed processing of the map and reduction operations. Provided each mapping operation is independent of the other, all maps can be performed in parallel—though in practice it is limited either or both of the data source and the number of central processing units (CPUs) near that data. Similarly, a set of 'reducers' can perform the reduction phase—all that is required is that all outputs of the map operation that share the same key are presented to the same reducer, at the same time. While this process can often appear inefficient compared to algorithms that are more sequential, Map/Reduce can be applied to significantly larger datasets than that which "commodity" servers can handle —a large server farm can use Map/Reduce to sort a petabyte of data in only a few hours. The parallelism also offers some possibility of recovering from partial failure of servers or storage during the operation: if one mapper or reducer fails, the work can be rescheduled—assuming the input data are still available.

Traditional modes of task scheduling in a distributed computing system as in the case of cloud computing can fail in the face of parallel programming methodologies like Map/Reduce. In this regard, traditional modes of task scheduling in distributed computing do not account for the interrelationship and interdependency of different tasks of a computational problem processed in parallel across different jobs. Rather, all decision making in respect to task scheduling is performed only with a view to the nature of an individual, atomic job to be assigned to a particular node. Consequently, the undesirable result can occur where an individual job estimated to require a duration of processing in a node that exceeds the duration of processing required for a different job will not be prioritized over the different job even though the completion of remaining tasks for the individual job will result in the completion of the job before a different job can complete.

BRIEF SUMMARY OF THE INVENTION

Embodiments of the present invention address deficiencies of the art in respect to scheduling tasks for parallel programming and provide a novel and non-obvious method, system and computer program product for holistic scheduling of tasks in a distributed computing environment. In an embodiment of the invention, a method for holistic task scheduling in a distributed computing environment is provided. The method includes selecting a first task for a first job and a second task for a different, second job, both jobs being scheduled for processing within a node a distributed computing environment by a task scheduler executing in memory by at least one processor of a computer. The method also can include comparing an estimated time to complete the first and second jobs. Finally, the first task can be scheduled for processing in the node when the estimated time to complete the second job exceeds the estimated time to complete the first job. Otherwise the second task can be scheduled for processing in the node when the estimated time to complete the first job exceeds the estimated time to complete the second job.

Optionally, even when an analysis of the estimated time needed to complete a first job exceeds the estimated time needed to complete a second job for two correspondingly different tasks vying for scheduling in the node, the task from the first job still can be preferred for scheduling in the node over the task from the second job if the time required to switch from executing tasks associated with the first job to tasks from the second job exceeds a threshold value thus negating the time advantage of the second job over the first job.

In another embodiment of the invention, a task scheduling data processing system is provided. The system includes a computer with at least one processor and memory and coupled to a distributed computing system of different nodes over a computer communications network. In one aspect of the embodiment, the distributed computing system is a cloud computing cluster. The system also includes a parallel processing module configured to perform parallel processing of a provided problem in the different nodes. In another aspect of the embodiment, the parallel processing module is a map/reduce module configured to perform a map/reduce operation on a selected problem. Finally, the system includes a task scheduler executing in the computer.

The task scheduler includes program code that when executed in the memory of the computer is enabled to select first and second tasks for respectively different first and second jobs scheduled for processing within a node of the distributed computing system by the task scheduler, to compare an estimated time to complete the first and second jobs, and to schedule the first task for processing in the node when the estimated time to complete the second job exceeds the estimated time to complete the first job, but otherwise scheduling the second task for processing in the node when the estimated time to complete the first job exceeds the estimated time to complete the second job.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for holistic task scheduling in a distributed computing environment, for example a cloud computing environment. In accordance with an embodiment of the invention different tasks can evaluated for execution in a node of a distributed computing system such as a cloud computing cluster. Each of the tasks can be associated with a different job. The job can be associated with a sub-problem of a problem subject to map/reduce computing. The time to complete the jobs for the corresponding tasks can be estimated. Thereafter, the task associated with the job most likely to complete soonest can be preferred and thus scheduled for execution in the node.

Figure 1:
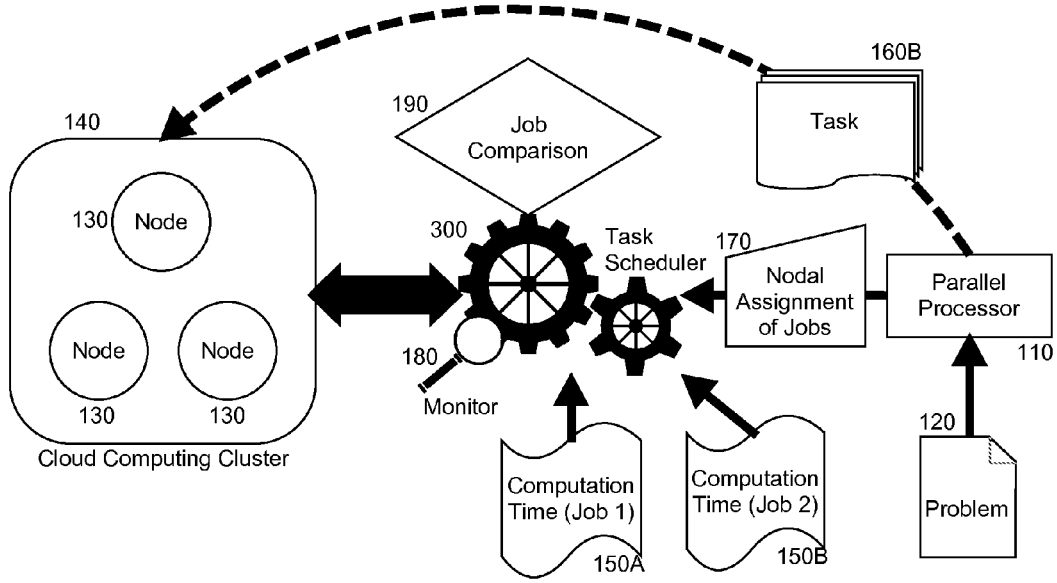
FIG. 1 is pictorial illustration illustrating a process for holistic task scheduling in a distributed computing environment.

In illustration, FIG. 1 pictorially shows a process for holistic task scheduling in a distributed computing environment. As shown in FIG. 1, a parallel processor 110 can sub-divide a computational problem 120 into different groupings of tasks 160B for parallel processing in different nodes 130 of a distributed computing system 140 such as a cloud computing cluster. A nodal assignment 170 can be established for the different groupings of tasks 160B and provided to a task scheduler 300 configured to schedule different jobs in different ones of the nodes 130 of the distributed computing system 140.

The task scheduler 300 in response to the receipt of the nodal assignment 170 for the grouping tasks 160B can determine for jobs corresponding to the tasks 160B slated for scheduling in a given one of the nodes 130 an estimated time to complete each job 150A, 150B. To the extent that tasks of the jobs 150A, 150B are presently executing in one or more nodes 130 fo the distributed computing system 140, monitor 180 can estimate a time necessary to complete the remaining tasks of the job. Job comparison module 190 subsequently can compare the estimated times to complete each job 150A, 150B. A particular one of the tasks 160B associated with a job determined to complete soonest will be assigned by the task scheduler 300 to the given one of the nodes 130.

Figure 2:
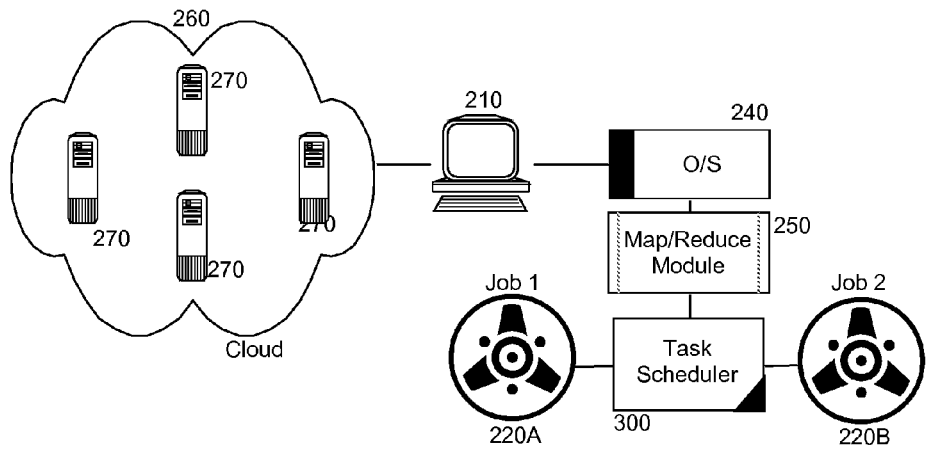
FIG. 2 is a schematic illustration of a distributed computing system configured for holistic task scheduling in a distributed computing environment; and, FIG. 3 is a flow chart illustrating a process for holistic task scheduling in a distributed computing environment.

The process described in connection with FIG. 1 can be implemented in a distributed computing data processing system. In further illustration, FIG. 2 is a schematic illustration of a distributed computing system configured for holistic task scheduling in a distributed computing environment. The system can include a host computer 210 with at least one processor and memory. An operating system 240 can execute in the computer 210 and can host the operation of a parallel processing module 250, for example a map/reduce module configured to implement map/reduce on a supplied problem.

The computer 210 can be communicatively coupled to a collection of nodes 270 in a distributed computing system 260, for instance a cloud computing environment. Further, a task scheduler 300 can be coupled to the parallel processing module 250. The task scheduler 300 can include program code that when executed in memory by at least one processor of the computer 210 can schedule a grouping of tasks for a selected job 220B for processing in nodes 270. In this regard, the program code of the task scheduler 300 can compare the estimated time to complete different jobs 220A, 220B corresponding to different tasks vying for scheduling in a given one of the nodes 270. The task associated with the job most likely to complete soonest will be assigned by the program code to the given one of the nodes 270. The remaining tasks are then left scheduling in different ones of the nodes 270.

Figure 3:
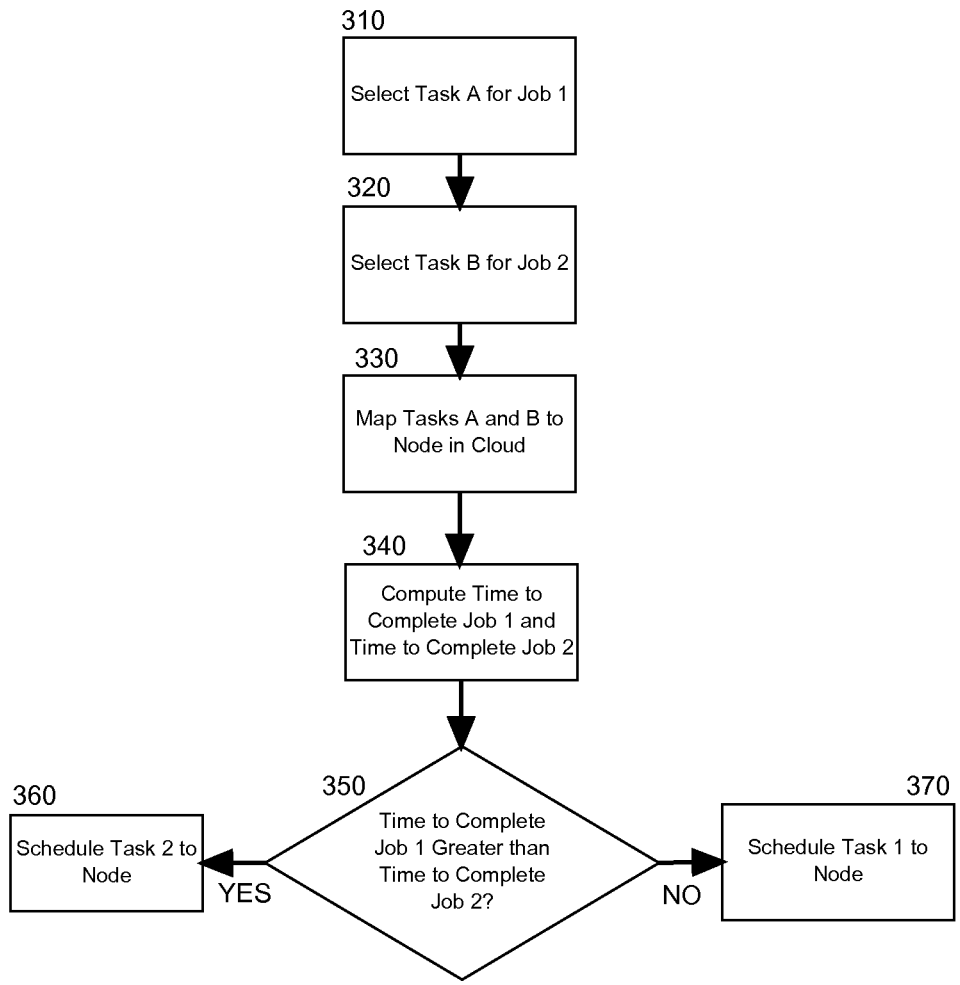

In yet further illustration of the operation of the task scheduler 300, FIG. 3 is a flow chart illustrating a process for holistic task scheduling in a distributed computing environment. Beginning in block 310, a first task corresponding to a first job can be selected for scheduling in the distributed computing environment. In block 320, a second task corresponding to a second job can be selected for scheduling in the in the distributed computing environment. In block 330, the tasks can be mapped to a particular node and in block 340, an estimated time to complete each of the jobs can be computed.

In decision block 350, if the time to complete processing of the first job exceeds that of the second job, in block 360 the second job can be scheduled for execution in the node. Otherwise, in block 370 the first job can be scheduled for execution in the node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for holistic task scheduling in a distributed computing environment, the method comprising:
    selecting first and second tasks associated with respectively different first and second jobs scheduled for processing within a node of a distributed computing environment by a task scheduler executing in memory by at least one processor of a computer;
    comparing an estimated time to complete each of the first and second jobs; and,
    scheduling the first task for processing in the node when the estimated time to complete the second job exceeds the estimated time to complete the first job, but otherwise scheduling the second task for processing in the node when the estimated time to complete the first job exceeds the estimated time to complete the second job.

2. The method of claim 1, wherein the first and second jobs individually comprise a set of tasks for a sub-problem for a problem processed according to map/reduce.

3. The method of claim 1, wherein the distributed computing environment is a cloud computing cluster.

4. The method of claim 1, wherein scheduling the first task for processing in the node when the estimated time to complete the second job exceeds the estimated time to complete the first job, but otherwise scheduling the second task for processing in the node when the estimated time to complete the first job exceeds the estimated time to complete the second job comprises, scheduling the second task for processing in the node when the estimated time to complete the second job exceeds the estimated time to complete the first job but a time required to switch from executing tasks associated with the second job to tasks from the first job exceeds a threshold value, and otherwise scheduling the first task for processing in the node.

* * * * *